July 11, 1939.  F. TUTTLE ET AL  2,165,426
TELESCOPING TRIPOD LEG
Filed July 9, 1937
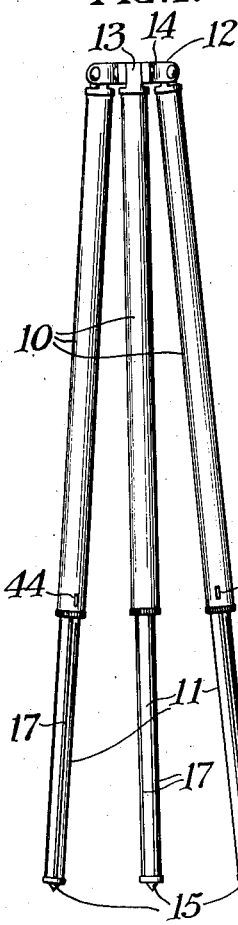
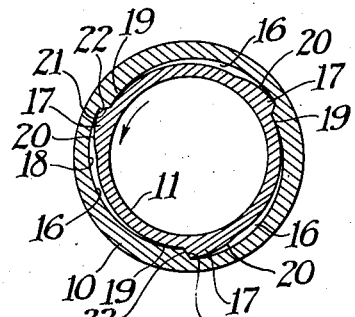
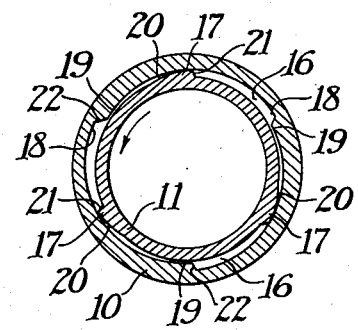
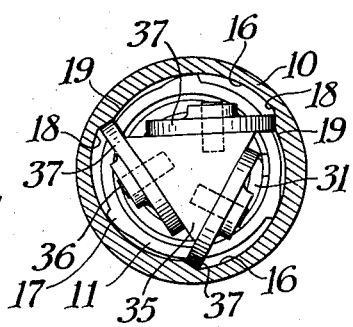
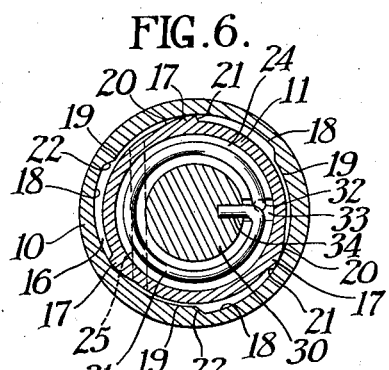
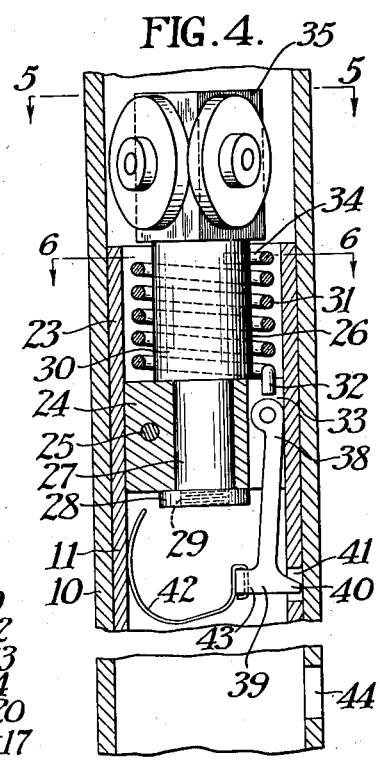
Fordyce Tuttle
Joseph Stiles Beggs
INVENTORS
BY
ATTORNEYS Patented July 11, 1939

2,165,426

UNITED STATES PATENT OFFICE 2,165,426

TELESCOPING TRIPOD LEG

Fordyce Tuttle and Joseph Stiles Beggs, Rochester, N. Y., assignors to Eastman Kodak Company, Rochester, N. Y., a corporation of New Jersey Application July 9, 1937, Serial No. 152,790

10 Claims. (Cl. 248—191)

This invention relates to adjustable telescopic tubes such as are used for tripod legs, and particularly to the formation of such tubes for allowing the outer and inner tubes to be immovably jammed together in any one of their relative positions of extension.

Due to the neatness of appearance which they present, the ease with which they are adjusted, as well as the compactness which they afford when collapsed, telescopic tubes have been extensively used for tripod legs. Although they present the above-mentioned advantages, the problem of immovably securing telescopic tubes in any position of relative adjustment has not, in apparatus heretofore presented, been successfully solved without the use of a positive engaging means which necessarily limits the adjustability of such tripod legs and makes them more or less cumbersome. The most desirable method of immovably securing telescopic tubes in any position of adjustment, without defeating the principle and convenience of such a structure, is to provide means whereby a friction can be set up between the tubular sections. This method has been previously appreciated, and several different structures have been provided for setting up a friction between telescopic tubes to clamp them in any adjusted position, including using the principle of eccentricity between cooperating telescoping parts which is brought into play through the rotation of one tube relative to another. However, structures of the latter type, which have been previously used, present the disadvantage that insufficient frictional contact is provided between the telescopic tubes in order to provide a clamping action which will support a comparatively heavy weight, and at the same time these previously used structures failed to provide means for preventing an accidental unclamping of the leg sections which might be incurred by a sudden jar.

Therefore, one object of the present invention is the provision of a tripod leg which is composed of telescoping tubes which are so formed that upon relative rotation thereof a frictional contact is set up between the tubes throughout the entire length of their interengagement whereby a rigid clamping will be secured which is sufficient to support fairly heavy weights. Another object is the provision of a tripod leg of the type referred to wherein means are provided for normally holding the telescopic tubes in their clamped position for preventing an accidental unclamping of the sections due to a jar. And still another object is the provision of a tripod leg of the type referred to wherein positively acting means is provided for limiting the extension of the telescoping tubes in order to prevent them from being accidentally pulled apart. And yet another object is the provision of a tripod leg of the type referred to which can be manufactured economically, which requires the fewest number of parts, which can be manipulated with ease and facility, and which is unlikely to become injured or damaged in ordinary service.

Briefly, the invention comprises a pair of telescoping tubes the inside of the outer one and the outside of the inner one of which are provided with cooperating cam surfaces, throughout their lengths, which can be brought into frictional clamping engagement by a relative rotation of the tubes. Means is also provided for normally rotating one tube relative to the other and into a clamping position in order to prevent an accidental unclamping of the tubes due to a jar.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a side elevation of a tripod equipped with our novel tripod legs, and showing said legs clamped in a partially extended position.

Fig. 2 is a horizontal section taken through one of the tripod legs, and showing the preferred embodiment of the telescoping tubes in an unclamped position wherein the inner tube can be slid relative to the outer tube, Fig. 3 is a horizontal section similar to Fig. 2, and showing the inner tube rotated relative to the outer tube and into a clamping position, Fig. 4 is a vertical section through one of the tripod legs, and showing the means for normally holding or forcing the inner tube into a clamping position relative to the outer tube, Fig. 5 is a section taken substantially on line 5—5 of Fig. 4, and Fig. 6 is a section taken substantially on line 6—6 of Fig. 4.

Like reference characters refer to corresponding parts throughout the drawing.

Referring now to the drawing, wherein the preferred embodiment of the invention is shown, the complete tripod is shown as comprising three legs, which are identical with one another, and which each include an outside tubular leg section 10, and an inside tubular leg section 11, which is adapted to telescope within the outside member 11. A tripod head 12 is connected to the upper end of the three outside tubular sections 10 in any suitable manner, but for the purpose of illustration we have shown a perforated lug 13 fixed to the upper end of each leg section 10 said lug being adapted to be pivotally mounted to the tripod head 12 by means of a bolt 14. The lower ends of the inner leg section 11 are provided with feet 15 which may be of any suitable nature so long as they grip the ground or foundation on which the tripod rests to prevent the legs from slipping.

Referring now to Figs. 2–6 the particular construction of the tripod legs will be described in detail, and since all three legs are identical in construction, a description of one will suffice for all three. The outside tubular leg section 10, which is made preferably of metal although any suitable material may be used, is formed, as by extrusion, in the case of metal, so that its inside surface is provided with three cam grooves 16 which extend throughout the full length of the leg section. As shown in the drawing, the section 10 is provided with three similar cam grooves 16 each spaced around the interior of the section so that respective portions of each cam groove are spaced 120 degrees with one another, but it is to be understood that this particular number and spacing of the cam grooves has been chosen merely as one condition giving a very satisfactory frictional clamping, as will be hereinafter described, and that the invention is in no way limited by this number or spacing of the cam grooves shown.

The periphery of the inside tubular leg section 11 is provided with three ribs 17 spaced 120 degrees from one another and extending the full length of the leg section 11, and which cooperate with the cam grooves 16, as will be hereinafter described, upon rotation of the inner leg section 11 relative to the outer leg section 10 to either frictionally clamp or allow the leg section 11 to be slid relative to the other leg section 10. As the inner leg section is rotated opposite to the direction indicated by the arrow and into the position shown in Fig. 2, the ribs 17 on the leg section 11 rest in the low points 18 of the cam grooves 16 and allow the leg sections 11 to be slid relative to the leg section 10 to any position of extension. In order to clamp the leg sections in any desired position of extension, the inner leg section 11 is rotated in the direction of the arrow, see Fig. 3, whereupon each of the ribs 17 ride upon the high points 19 of the cam grooves 16 to set up a frictional clamping engagement between the two leg sections. It will be understood, that since the cam grooves 16 extend the full length of the outer leg section 10, and the ribs 17 extend the full length of the inner leg sections 11, when the two sections are rotated to the clamping position, see Fig. 3, a considerable surface of frictional contact will be maintained between the two, varying, of course, with the amount of overlap between the leg sections 10 and 11 depending upon their relative extensions, so that a rigid clamping action will be provided. As shown in Figs. 2 and 3, the engaging faces of the ribs 17 are provided with sloping faces 20 for the purpose of giving a larger area of surface contact between the ribs and the high points 19 in their clamping positions, but any form of rib, so long as it extends sufficiently from the periphery of the inner leg section, will give a certain amount of frictional contact. The rotation of the inner leg section 11 into an unclamping position is positively limited in the position where the leg section 11 can be telescoped with respect to leg section 10 when the sharp face 21 of the rib 17 contacts the offset 22, which will hereinafter be referred to as tracks, on the outside leg section 10 connecting the high point 19 of one cam groove 16 with the low point 18 of the succeeding cam groove so that the operator does not have to fish for the positions of relative rotation of the leg sections wherein they can be extended. Although, for the purpose of illustration, we have shown three cam grooves 16 extending the full length of leg section 10 and three ribs 17 extending the full length of leg section 11 for cooperating therewith for clamping leg sections together, it is to be understood that one or more cooperating grooves and ribs on the respective leg sections can be provided throughout the length of each leg section without going beyond the scope of the present invention. It is also pointed out that although we have chosen to show the cam grooves 16 on the inside of the outer leg section 10 and the ribs 17 of the periphery of the leg section 11, this order could be reversed, putting the cam grooves in the periphery of the leg section 11 and the ribs on the inside surface of the leg section 10 without going beyond the scope of the present invention.

For the purpose of normally holding the leg sections 10 and 11 in a position of relative rotation where they are clamped in order to prevent them from becoming accidentally unclamped due to some jar, the following structure, shown in detail in Figs. 4–6, is provided. To the inside and near the upper end 23 of the inner leg section 11 is fixed an annular bushing 24 by pin 25 extending into but not through the wall of said leg section. The stud indicated generally as 26 is rotatably mounted in the annular bushing 24 by having a reduced end 27 thereon passing through the aperture in said bushing. To prevent the stud 26 from becoming accidentally removed from the bushing 24 a washer 28 having a diameter greater than that of the aperture in the annular bushing is connected to the end of the reduced portion 27 of the stud 26 by a screw 29. An enlarged circular portion 30 of the stud 26 has one end resting on the top of the annular bushing 24 which prevents longitudinal movement of the stud relative to the bushing in cooperation with the washer 28.

Surrounding the circular portion 30 of the stud 26 is a coil spring 31 one end 32 of which is fastened to the bushing 24 by extending into the longitudinal slot 33 in one side thereof, and the other end 34 of which is fastened to the upper end of the circular portion 30 of the stud 26, see Fig. 6. The upper end 35 of the stud 26 extending above the upper end 23 of the inner leg section 11 and into the interior of the outer leg section 10 is triangular in shape, and has an axle 36 extending perpendicularly from each face thereof. Rotatably mounted on each axle 36 is a roller 37 which engages and rides on the track 22 of the inside surface of the outer leg section 10. In assembling the tripod leg, with the leg sections in the unclamped position, see Fig. 2, the triangular end of the stud is rotated counter-clockwise, looking at Fig. 4, until the coil spring 31 is sufficiently tensioned. With the spring thus tensioned the inner tube 11 is slid up into the outer tube 10 until the rollers 37 engage the tracks 22 whereupon the stud is prevented against further clockwise motion so that the tension of the spring normally tends to rotate the inner tube 11 counter-clockwise relative to the outer tube 10 and into the clamping position shown in Fig. 3. Particular cooperation between the rollers 37 and the tracks 22 as well as serving to maintain one end of the spring fixed whereby it is under normal tension to rotate the inner tube 11 into clamping position relative to the outer tube 10, also serves as a guiding means to facilitate, rather than hinder, longitudinal adjustment of the inner tube 11 relative to the outer tube 10.

In order to prevent the inner leg section 11 from being pulled out of telescoping engagement with the outer leg section 10, the following structure is provided. A T shaped lever has one end 38 pivoted in the slot 33 of the bushing 24 so that the head 39 thereof hangs downward within the inner tube 11, see Fig. 4. One end 40 of the head 39 is normally spring pressed through an aperture 41 in the wall of the inner leg section 11 by means of a spring 42 which is confined within the leg section 11 and which has one end fastened to the end 43 of the head 39. The end 40 of the head 39 normally rides along the inner surface of the outer tube 10 when the two leg sections are in any position except their fully extended one, at which time the end 40, which is suitably tapered, will snap through an aperture 44 in the outer leg section to positively hold the tubes against accidental separation. In order to release the two leg sections from this positive engagement, the end 40 of the lever 38 is merely depressed with the fingernail, or any sharp pointed instrument, until it is relieved from the aperture 44 whereupon the leg sections 10 and 11 can be either disassembled or collapsed to any desired extent. Since there is only one position of relative rotation in which the inner leg section 11 can be slid relative to the outer leg section 10, see Fig. 2, this definitely limits the position along approximately one element of the outer leg section 10 on which the end 40 of the lever 38 will slide during longitudinal adjustment of the leg, and the aperture 44 in the outer tube 10 is located in this path.

The procedure for adjusting these tripod legs is very simple. The inner leg section is grasped by the hand and rotated against the coiled spring 31 in a clockwise direction until a limit is reached, see Fig. 2, whereupon the inner leg section 11 can be either retracted or extended relative to the leg section 10 as the case may be. After the desired position of extension is obtained, the leg section 11 is released allowing the spring 31 to rotate it in a counter-clockwise direction relative to the other leg section, and into a clamping position. It is not likely that a strong enough spring 31 will be used so that the clamping action induced in the leg sections 10 and 11 by it alone could be relied on for a rigid enough clamping action, but a final rotation of the leg section 11 by hand will be used to set up the clamping action, relying upon the coil spring 31 primarily as a safeguard against an accidental unclamping action due to a jar. In addition, although the action of the coil spring 31 alone is not recommended for inducing the most rigid clamping action between the leg sections, it will be appreciated that if, in the course of adjustment, the operator inadvertently releases the leg section 11, the spring 31 will immediately rotate this leg section relative to the outer leg section and will set up a clamping action between the two which will be sufficient to prevent a complete collapse of the leg section as would be the case in previously designed telescoping tripod legs.

From the above description it will be readily understood that we have provided a telescoping tripod leg which is designed to give a large area of frictional contact between the tubes upon relative rotation thereof into a clamping position whereby the leg sections can be very rigidly clamped with the least amount of exertion on the part of the operator. In addition to the fact that it gives a frictional clamping action which is much more rigid than those previously used, our telescoping tripod leg provides a normally acting means which prevents an accidental unclamping of the leg sections due to a jar, as well as serving to set up, automatically, a clamping action between the leg sections should the operator inadvertently release the movable leg sections during adjustment thereby preventing complete accidental collapse of the legs.

Although we have shown and described certain specific embodiments of our invention, we are fully aware that many modifications thereof are possible. Our invention, therefore, is not to be restricted except insofar as is necessitated by the prior art, and by the spirit of the appended claims.

Having now described our invention, what we claim is:

1. In a telescoping tripod leg the combination of a tubular leg section having a cam surface on its inside surface and extending throughout the length thereof, a second tubular leg section slidably and rotatably mounted within said first leg section and having a cam surface on its periphery and extending throughout the length of said leg section, said cam surfaces in one position of relative rotation of the leg sections adapted to engage with one another to frictionally lock the leg sections against relative sliding movement, and adapted in another position of relative rotation of the leg sections to be disengaged whereby the leg sections can be slid relative to one another, and means connected to one of said leg sections and acting on the other to normally cause one leg section to rotate relative to the other whereby the cam surfaces of the two are in frictional engagement.

2. In a telescoping tripod leg the combination of a tubular leg section having a plurality of cam surfaces spaced around its inside surface and each extending throughout the length thereof, a second tubular leg section slidably and rotatably mounted within said first leg section, and having a plurality of cam surfaces spaced around its periphery and extending throughout the length of said leg section, each of the cam surfaces on one leg section in one position of relative rotation of the leg sections adapted to engage with one of the cam surfaces on the other leg section to frictionally lock the leg sections against relative sliding movement, and adapted in another position of relative rotation of the leg sections to be disengaged whereby the leg sections can be slid relative to one another, and means connected to one of said leg sections and acting on the other and normally tending to rotate the leg sections relative to one another and into a position of relative rotation wherein the cam surfaces of the two are in frictional engagement.

3. In a telescoping tripod leg the combination of a tubular leg section the inside surface of which is provided with a cam-groove extending throughout the length of the leg section, a second tubular leg section rotatably and slidably mounted within said first leg section, a rib on the periphery of said second leg section and extending throughout the length thereof, said rib adapted when leg sections are in one position of relative rotation to extend into the low point of the cam-groove whereby the leg sections can be extended longitudinally relative to one another, and said rib adapted when the leg sections are in another position of relative position to frictionally engage the high point of the cam-groove whereby the leg sections are frictionally locked against relative longitudinally adjustment, of means normally tending to rotate said leg sections relative to one another into a locking position, said means including a coiled spring one end of which is held stationary by the first leg section, and the other end of which is connected with the movable leg section.

4. In a telescoping tripod leg the combinaiton of a tubular leg section the inside surface of which is provided with a plurality of cam-grooves each definitely spaced from one another and extending throughout the length of the leg section, a second tubular leg section rotatably and slidably mounted within said first leg section, a plurality of ribs spaced around the periphery of said second leg section and each extending throughout the length thereof, each of said ribs adapted when the leg sections are in one position of relative rotation to extend into the low point of one of said cam-grooves whereby the leg sections can be extended longitudinally relative to one another, and each of said ribs adapted when the leg sections are in another position of relative rotation to frictionally engage the high point of one of said cam-grooves whereby the leg sections are frictionally locked against relative longitudinal adjustment, of a spring connected with one of said leg sections and acting on the other and normally tending to rotate the leg sections relative to one another and into a position of relative rotation wherein the cam-grooves and the ribs on the two leg sections are in frictional engagement to lock the sections against relative longitudinal adjustment.

5. In a telescoping tripod leg the combination with an outside tubular leg section having a plurality of cam surfaces spaced around the inside surface thereof, an inside tubular leg section rotatably and slidably mounted within said outside tubular leg section, a plurality of cam surfaces spaced around the periphery of said inside leg section, and adapted when the leg sections are in one position of relative rotation to frictionally engage the cam surface on outside leg section to frictionally lock the two against relative longitudinal adjustment, and adapted when the leg sections are in a second position of relative rotation to disengage the cam surfaces on the outside member to permit a relative longitudinal adjustment of said leg sections, of means normally tending to rotate the leg sections relative to one another and into a position of relative rotation wherein they are locked, said means including a coiled spring situated within the tubular leg sections and extending longitudinally thereof, one end of said spring being connected to the inside tubular leg section, and the other end of said spring being held against displacement by the outside leg section whereby the tension in the spring tends to normally rotate one leg section relative to the other and into a position of relative rotation wherein the two leg sections are locked against longitudinal adjustment.

6. In a telescoping tripod leg the combination with an outside tubular leg section having a plurality of cam surfaces spaced around the inside surface thereof, an inside tubular leg section rotatably and slidably mounted within said outside tubular leg section, a plurality of cam surfaces spaced around the periphery of said inside leg section, and adapted when the leg sections are in one position of relative rotation to frictionally engage the cam surfaces on the outside leg section to frictionally lock the two against relative longitudinal adjustment, and adapted when the leg sections are in a second position of relative rotation to disengage the cam surfaces on the outside member to permit a relative longitudinal adjustment of said leg sections, of means for normally causing rotation of the leg sections relative to one another and into a position of relative rotation wherein they are locked, said means including a bushing fixed to the interior of the inside tubular leg section and located near the upper end thereof, a stud rotatably mounted in said bushing and having its upper end extending beyond the upper end of the inside tubular leg section and into the interior of the outside leg section, a coiled spring encircling said stud and having one end fixed to the bushing and the other end fixed to the stud, and means between the stud and the outside leg section preventing said stud from rotating relative thereto whereby the normal tension of the spring tends to rotate the inside leg section relative to the outside leg section and into a locking position.

7. In a telescoping tripod leg the combination with an outer tubular leg section, a plurality of cam surfaces formed on and spaced around the inside surface of said leg section and extending the full length of said leg section, one end of each cam surface extending into the bore of said tubular leg section and forming a track, an inner tubular leg section rotatably and slidably mounted within said outer tubular leg section, a plurality of cam surfaces spaced around the periphery of said inner leg section, and adapted when the leg sections are in one position of relative rotation to frictionally engage the cam surfaces on the outside leg section to frictionally lock the two against relative longitudinal adjustment, and adapted when the two leg sections are in a second position of relative rotation to disengage the cam surfaces on the outer member to permit a relative longitudinal adjustment of said leg sections, of means for normally causing rotation of one leg section relative to the other and into a position of relative rotation wherein they are locked, said means including a bushing fixed to the interior of the inner tubular section near the upper end thereof, a stud rotatably mounted in said bushing and extending beyond the upper end of said inner tube and into the interior of the outer tubular leg section, one or more rollers rotatably mounted on the upper end of the stud to engage the tracks on the inside surface of the outside tubular member whereby the stud is prevented from rotating relative to said outside member, and a coiled spring encircling said stud, one end of said spring being connected to the bushing, while the other end thereof is connected to the stud.

8. In a telescoping tripod leg the combination of a tubular leg section the inside surface of which is provided with a cam-groove extending throughout the length of the leg section, a second tubular leg section rotatably and slidably mounted within said first leg section, a rib on the periphery of said second leg section and extending throughout the length thereof, said rib adapted when the leg sections are in one position of relative rotation to extend into the low point of the cam-groove whereby the leg sections can be extended longitudinally relative to one another, and said rib adapted when the leg sections are in another position of relative rotation to frictionally engage the high point of the cam-groove whereby the leg sections are frictionally locked against relative longitudinal adjustment, of means connected with one of said leg sections and acting on the other and normally tending to rotate the leg sections relative to one another into a position of relative rotation wherein the cam-groove and the rib on the two sections are in frictional engagement to lock the sections against relative longitudinal adjustment, and means carried by one of said leg sections adapted to positively engage the other leg section when the two have reached the end of their relative longitudinal extension whereby they cannot become disconnected.

9. In a telescoping tripod leg the combination with a tubular leg section the inside surface of which is provided with a plurality of cam-grooves each definitely spaced from one another and extending throughout the length of the leg section, a second tubular leg section rotatably and slidably mounted within said first leg section, a plurality of ribs spaced around the periphery of said second leg section and each extending throughout the length thereof, each of said ribs adapted when the leg sections are in one position of relative rotation to extend into the low points of one of said cam-grooves whereby the leg sections can be extended longitudinally relative to one another, and each of said ribs adapted when the leg sections are in another position of relative rotation to frictionally engage the high point of one of said cam-grooves whereby the leg sections are frictionally locked against relative longitudinal adjustment, of means connected with one of said leg sections and acting on the other and normally tending to rotate the leg sections relative to one another into a position of relative rotation wherein the cam-grooves and the ribs on the two sections are in frictional engagement to lock the sections against relative longitudinal adjustment, and means for preventing the accidental separation of said tubular leg sections, and including a spring pressed member fixed to the interior of the inside leg section to extend through an aperture in the wall of said leg section, and adapted to snap into an aperture in the wall of the outside tubular leg section, when the two leg sections have reached a given point in their relative longitudinal extension.

10. In a telescoping tripod leg the combination with an outside tubular leg section having a plurality of cam surfaces spaced around the inside surface thereof, an inside tubular leg section rotatably and slidably mounted within said outside tubular leg section, a plurality of cam surfaces spaced around the periphery of said inside leg section, and adapted when the leg sections are in one position of relative rotation to frictionally engage the cam surfaces on the outside leg section to frictionally lock the two against relative longitudinal adjustment, and adapted when the leg sections are in a second position of relative rotation to disengage the cam surfaces on the outside member to permit a relative longitudinal adjustment of said leg sections, of means normally tending to rotate the leg sections relative to one another and into a position of relative rotation wherein they are locked, said means including a bushing fixed to the interior of the inside tubular leg section and located near the upper end extending beyond the upper end of the inside tubular leg section and into the interior of the outside leg section, a coiled spring encircling said stud and having one end fixed to the bushing and the other end fixed to the stud, and means between the stud and the outside leg section to prevent said stud from rotating relative thereto whereby the normal tension of the spring tends to rotate the inside leg section relative to the outside leg section and into a locking position, and means for preventing the accidental separation of said tubular leg sections, and including a lever within the inside leg section and pivoted at one end to the bushing, the other end thereof being spring pressed through an aperture in the wall of said inside leg section, and adapted when the leg sections have reached a given point in their relative extension to snap through an aperture in the wall of the outside tubular leg section.

FORDYCE TUTTLE.
JOSEPH STILES BEGGS.